United States Patent [19]

McHugh

[11] 4,325,583

[45] Apr. 20, 1982

[54] LOW AXIAL STIFFNESS THRUST BEARING

[75] Inventor: James D. McHugh, Schenectady, N.Y.

[73] Assignee: General Electric Company, Schenectady, N.Y.

[21] Appl. No.: 164,071

[22] Filed: Jun. 30, 1980

[51] Int. Cl.³ ............................................. F16C 32/06
[52] U.S. Cl. ........................................ 308/9; 308/170
[58] Field of Search ..................... 308/9, DIG. 1, 170, 308/240, DIG. 15, 168

[56] References Cited

U.S. PATENT DOCUMENTS

| | | | |
|---|---|---|---|
| 2,523,310 | 9/1950 | Kirkpatrick | 308/9 |
| 2,756,114 | 7/1956 | Brunzel | 308/9 |
| 2,899,243 | 8/1959 | Acterman | 308/9 |

*Primary Examiner*—Lenard A. Footland

*Attorney, Agent, or Firm*—Jerome C. Squillaro

[57] ABSTRACT

A low axial stiffness thrust bearing is disclosed. The thrust bearing includes a housing having a generally cylindrical space formed therein and a generally cylindrical thrust collar located coaxially within the space. The axial length of the cylindrical space is sufficiently greater than the axial length of the thrust collar to permit the thrust collar to move axially within the cylindrical space over a predetermined distance and to insure that first and second fluid chambers are formed on opposite sides of the thrust collar when the thrust collar is located centrally within the cylindrical space. A fluid circuit supplies fluid under pressure to the first and second chambers in such a manner that the fluid attempts to maintain the thrust collar at a predetermined axial location within the space even when external thrust forces are placed on the thrust collar.

2 Claims, 9 Drawing Figures

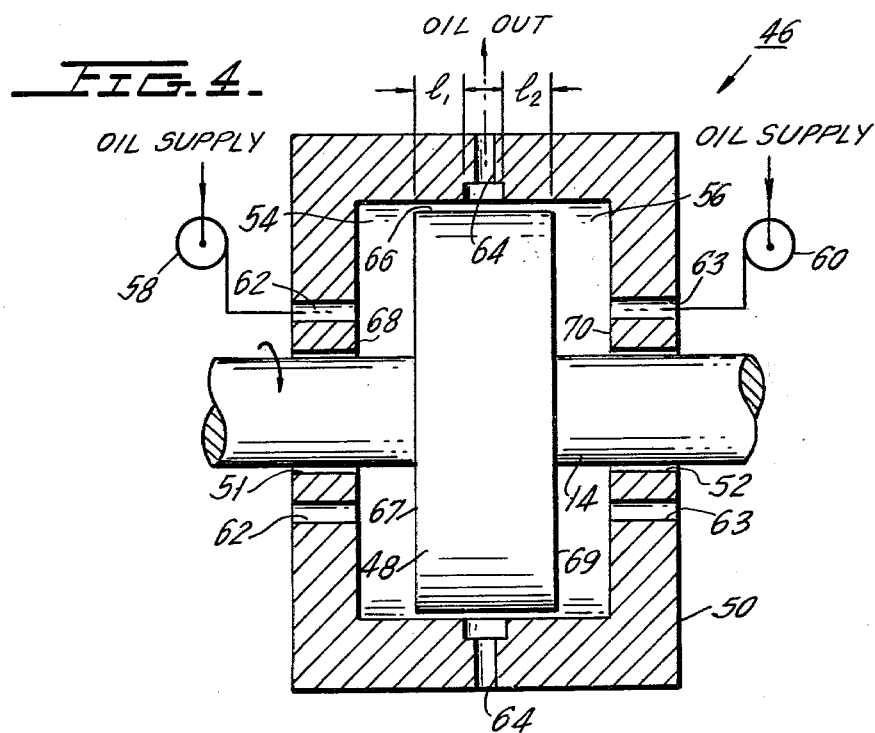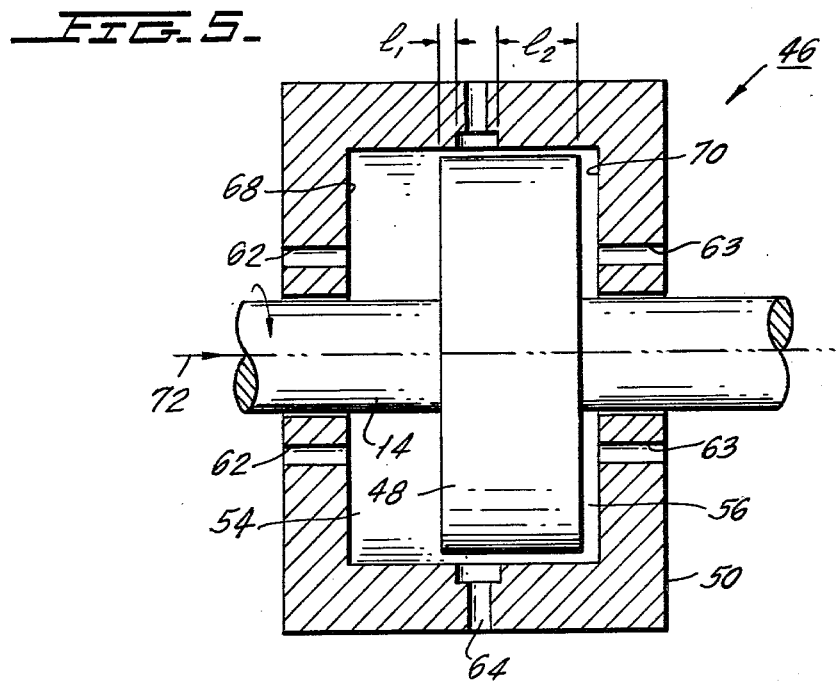

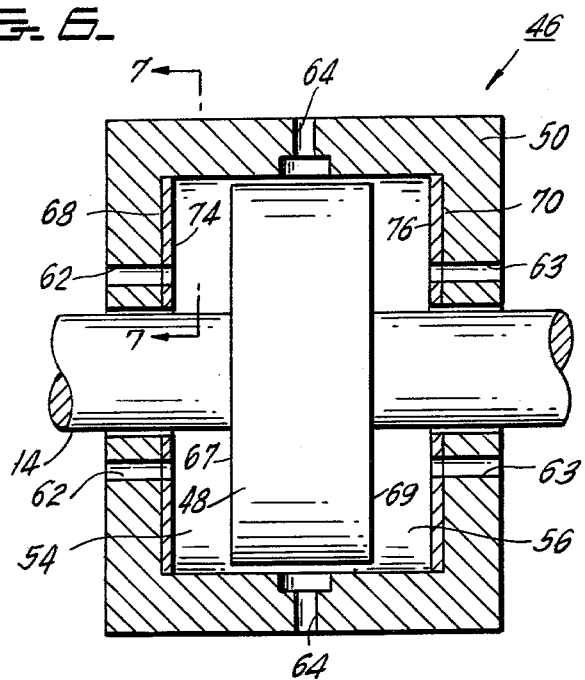
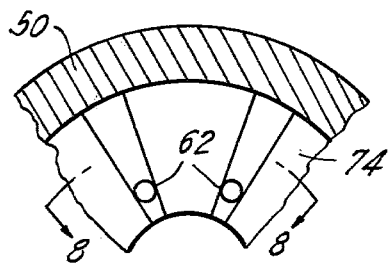
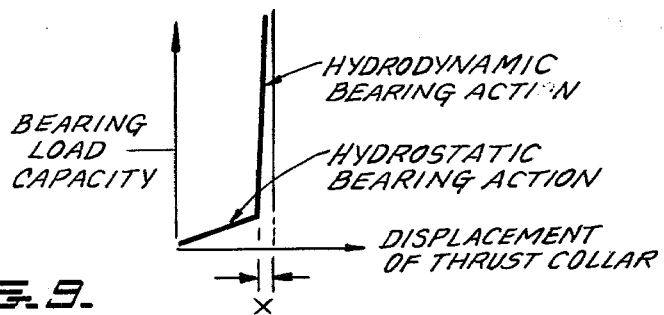

LOW AXIAL STIFFNESS THRUST BEARING

BACKGROUND OF THE INVENTION

The present invention relates to a low axial stiffness thrust bearing and more particularly to a thrust bearing which may be used in combination with a conventional thrust bearing on a single or coupled shaft system.

Prior art thrust bearings such as a tilting pad or tapered land bearing, have a high axial stiffness under load, generally measured in millions of pounds per inch. A typical use of such system is to axially locate the drive shaft of a turbine-generator set such as that illustrated schematically in FIG. 1. As shown by way of example in FIG. 1, the drive shaft 10 of a gas turbine 12 is coupled to the central shaft 14 of an electric generator 16 by a clutch mechanism 18. The drive shaft 10 is radially supported by a pair of radial bearings 20 and the central shaft 14 is supported by a pair of radial bearings 22. During normal operation, clutch 18 couples shafts 10 and 14 such that gas turbine 12 drives electric generator 16. In this mode, electric generator 16 generates electric power which may be applied to a utility power grid or other electrical system. When clutch 18 is engaged, shafts 10 and 14 operate as a single shaft which is axially aligned by a standard hydrodynamic thrust bearing 24 such as the tilting pad or tapered land types. As long as clutch 18 remains engaged, the single bearing 24 serves to axially align both shaft 10 and shaft 14 with respect to gas turbine 12 and generator 16, respectively.

In those applications wherein generator 16 is supplying a utility power grid, it is often desirable to have clutch 18 disengage in order that generator 16 may run as a motor for electical network power factor correction. In such cases, and in the absence of other provisions, the axial alignment of central shaft 14 is no longer maintained by thrust bearing 24 and shaft 14 is free to move axially due to the magnetic forces which result from generator 16 being electrically "off-center." The simplest way to solve this problem would appear to be to place an additional thrust bearing between generator 16 and clutch 18. While such a thrust bearing would insure that central shaft 14 remains axially aligned with respect to generator 16, the use of an additional standard thrust bearing is impractical for the following reasons.

The interiors of the turbine and generator contain high heat sources such as hot gases, steam or current carrying electrical conductors. The exterior turbine-generator shells, base and foundation, however, are in a relatively cool ambient environment. Two points on the shaft separated by a given axial distance will therefore separate more from thermal expansion than two equally distant points on the base. Thus if a standard design thrust bearing were placed between generator 16 and clutch 18, as illustrated schematically in FIG. 3 by thrust bearing 46, the distance between the thrust collars 26 and 48 would increase during a turbine-generator start-up. The axial distance between the two base-mounted bearing support points 24 and 46, however, would grow a lesser amount. This difference in axial thermal expansion together with the extremely high stiffness of a standard hydrodynamic thrust bearing would create destructive thrust loads at the two thrust bearings. It is clear therefore that two standard thrust bearings cannot be used on a single or coupled shaft system in such a situation.

In order to avoid this problem, the prior art has designed complicated clutch mechanisms which will enable thrust bearing 24 to absorb the thrust on central shaft 14 imparted by generator 16 during the intervals in which clutch 18 disengages shafts 10 and 14. A simplified schematic diagram of one such prior art clutch is illustrated in FIG. 2. As shown therein, the primary components of the clutch 18 is an axially displaceable housing 28, a pair of thrust collars 30, 32 and sliding sleeve 34. The housing 28 is mounted in a stationary housing 36 in a manner which permits housing 28 to move in an axial direction but prevents the rotation of housing 28 about the axis of shafts 10 and 14. Thrust bearing collars 30, 32 are coupled to shafts 10, 14, respectively, for rotation therewith. A projection 38 on each collar 30, 32 is received in a corresponding recess 40 formed in housing 28 so as to define respective thrust bearings.

The sliding sleeve 34 is located radially inward of collars 30, 32 and is slidable in the axial direction. A plurality of teeth 42 are formed about the outer perimeter of opposite ends of sleeve 34 and engage corresponding teeth 44 located on the inner periphery of the inner ends of collars 30, 32. When clutch mechanism 18 is engaged, sleeve 34 is in the position illustrated causing collars 30, 32 to rotate as a single unit. Additionally, any thrust forces placed on shaft 14 by generator 16 are transmitted to shaft 10 via axially slidable housing 28 due to the inter connection between thrust collars 30, 32 and housing 28. As a result, any thrust forces placed on shaft 14 are absorbed by thrust bearing 24.

When clutch mechanism 18 is disengaged, sleeve 34 is moved axially to the right as viewed in FIG. 2 so as to disengage teeth 42, 44. In this condition, collars 30, 32 (and with them shafts 10, 14) are free to rotate independently of one another. However, thrust forces placed on shaft 14 are still transmitted to shaft 10 via axially slidable housing 28 due to the inter connection between thrust collars 30, 32 and housing 28.

When the clutch mechanism 18 is disengaged and shaft 10 is stationary, any thrust load placed on shaft 14 will ultimately be absorbed by the bearing housing 24. Relative rotary sliding motion, however, will exist between the collar 38 on the shaft extension 30 and the corresponding recess 40 in the housing 28. These relatively sliding surfaces 38 and 40 comprise a thrust bearing which must be capable of transmitting the full thrust load from rotating shaft 14 to stationary shaft 10.

The foregoing arrangement provides for the absorption of thrust load from shaft 14 when the clutch 18 is either engaged or disengaged. It also avoids destructive thrust loads arising from thermal expansion differences. However, the clutch 18 must be designed to include a thrust bearing 38, 40. Both the clutch 18 and the thrust bearing designs 38, 40 are complicated and compromised by their interdependence. Thus such a clutch mechanism is likely to require more frequent repair than if the thrust bearing function is separated from the clutch function.

BRIEF DESCRIPTION OF THE INVENTION

In order to overcome the foregoing drawbacks of the prior art clutches, the present invention provides a low stiffness thrust bearing exhibiting a relatively large axial float which serves to axially align generator shaft 14 when clutch 18 is disengaged yet is able to withstand the forces created due to differences in the thermal expansion of shafts 10 and 14 when clutch 18 is engaged.

In accordance with the foregoing, the thrust bearing of the present invention comprises:

a housing having a generally cylindrical space formed therein;

a generally cylindrical thrust collar located coaxially within said cylindrical space, the axial length of said cylindrical space being significantly greater than the axial length of said thrust collar such that said thrust may be moved axially within said cylindrical space over a predetermined distance and such that the first and second fluid chambers are formed opposite sides of said thrust collar when said thrust collar is located centrally within said cylindrical space; and fluid circuit means for supplying fluid under pressure to said first and second chambers in such a manner that said fluid attempts to maintain said thrust collar at a predetermined axial location within said cylindrical space even when external thrust forces are placed on said thrust collar.

BRIEF DESCRIPTION OF THE DRAWINGS

For the purpose of illustrating the invention, there is shown in the drawings several embodiments which are presently preferred; it being understood, however, that the invention is not limited to the precise arrangements and instrumentalities shown.

FIG. 4 is a schematic diagram of a low axial stiffness hydrostatic thrust bearing constructed in accordance with the principles of the present invention.

FIG. 5 is a schematic diagram of the thrust bearing of FIG. 4 under thrust load.

FIG. 6 is a schematic diagram of a combined hydrostatic- hydrodynamic thrust bearing constructed in accordance with the principles of the present invention.

FIG. 7 is a view of the tapered land surfaces on the side wall of the bearing of FIG. 6 as illustrated along lines 7—7 of FIG. 6.

FIG. 8 is a cross-sectional view of the tapered land surfaces on the side wall of the bearing of FIG. 6 taken along lines 8—8 of FIG. 7.

FIG. 9 is a graph illustrating the bearing load capacity of the hydrostatic-hydrodynamic thrust bearing of FIG. 6 as a function of the displacement of the thrust collar from its axially centered position.

DETAILED DESCRIPTION OF THE INVENTION

Figure 3:
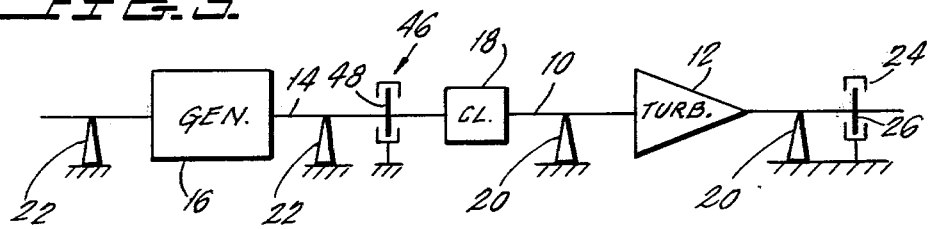
FIG. 3 is a schematic diagram of a generator-turbine set using the thrust bearing of the present invention.

Referring now to the drawings wherein like numerals indicate like elements, there is shown in FIG. 3 a schematic diagram of a generator-turbine set utilizing a low axial stiffness thrust bearing of the present invention. While such a generator-turbine set is illustrated by way of example, it should be recognized that the thrust bearing of the present invention may be used in connection with any single or connected shaft system.

Figure 1:
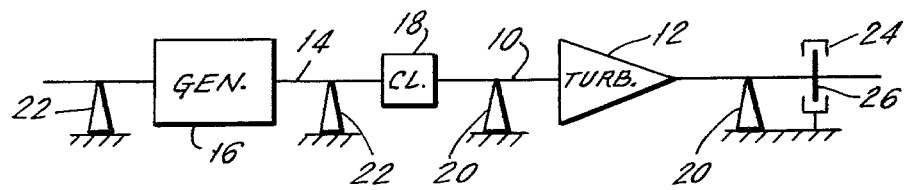
FIG. 1 is a schematic diagram of a prior art tubine-generator set.
Figure 2:
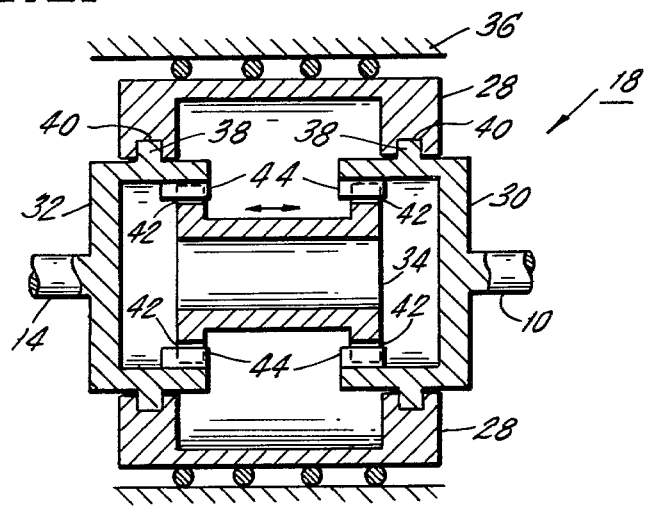
FIG. 2 is a schematic diagram of a prior art clutch mechanism.

The generator-turbine system illustrated in FIG. 3 is identical to that illustrated in FIG. 1 with the addition of the low stiffness thrust bearing 46 of the present invention. The main attributes of thrust bearing 46 are its low axial stiffness and relatively large axial float. As a result of these features, thrust bearing 46 is able to accommodate variations in the spacing between the thrust collars 26, 48 of the bearings 24, 46 respectively, caused by thermal expansion. Additionally, when clutch 18 disengages shafts 10 and 14, bearing 46 will have sufficient stiffness to absorb normal thrust forces placed on shaft 14 by generator 16.

A schematic diagram of a first embodiment of a low stiffness hydrostatic thrust bearing formed in accordance with the principles of the present invention is illustrated in FIG. 4. As shown in FIG. 4, thrust collar 48 is housed in a generally cylindrical housing 50 which surrounds the central shaft 14 of the generator 16. A pair of fluid seals (not shown) are located between respective radially inward edges 51, 52 of housing 50 and the shaft 14 so as to prevent leakage of fluid located in fluid chambers 54, 56.

Fluid chamber 54 is defined between the side wall 68 of housing 50 and the side wall 67 of thrust collar 48 while fluid chamber 56 is defined between the side wall 70 of housing 50 and the side wall 69 of thrust collar 48. The volume of each fluid chamber 54, 56 varies as a function of the axial location of collar 48 with respect to housing 50. In the embodiment illustrated, the volume of the two chambers 54, 56 will be equal when thrust collar 48 is centrally located within housing 50 as illustrated in FIG. 4. When thrust collar 48 is displaced as illustrated in FIG. 5, the volumes of these chambers will vary in an inverse manner. Fluid, such as oil, is pumped under pressure into each of the fluid chambers 54, 56 by respective pumps 58, 60. Particularly, pump 58 pumps oil from an oil supply into chamber 54 via a plurality of openings 62 while pump 60 pumps oil from an appropriate oil supply into chamber 56 via a plurality of openings 63. A plurality of exit openings 64 are spaced circumferentially about the radially outward end of housing 50 at a point midway between the opposite side walls 68, 70 of housing 50. Openings 64 are connected to chambers 54, 56 via a cylindrical space 66 formed between the outer diameter of thrust collar 48 and the inner diameter of housing 50. The rate at which fluid leaves chambers 54, 56 is determined by the distances L1, L2, respectively, between the chambers 54, 56 and the openings 64 as measured in the axial direction. When thrust collar 48 is centrally located within housing 50, the distances L1, L2 are equal and an equal amount of fluid flows out of both chambers 54, 56.

Pumps 58, 60 supply oil to their respective chambers 54, 56 with equal pressure. As a result, when collar 48 is centrally located, the fluid flow into and out of chambers 54, 56 is equal and the fluid in chambers 54, 56 applies equal and opposite forces to side walls 67, 69, respectively, of collar 48. These forces attempt to maintain thrust collar 48 centrally located within housing 50 and resist any movement of thrust collar 48 from its central position. If the thrust collar 48 is moved off center as illustrated in FIG. 5, the distances L1, L2 between chambers 54, 56 and openings 64 vary as shown causing an increased resistance to the flow of fluid out of chamber 56 and a decreased resistance to the flow of fluid out of chamber 54. As a result, the fluid pressure in chamber 56 (and therefore the force on side wall 69) is increased while the fluid pressure in chamber 54 (and therefore the force on side wall 67) is decreased. In the preferred embodiment, the pressure of the fluid in each chamber 54, 56 varies linearly with the displacement of collar 48 off center; the pressure in one chamber increasing as the other decreases. The net effect of this is to place a biasing force on collar 48 in a direction which attempts to return collar 48 to its central location and which increases as the distance that the thrust collar is off center increases. In this manner thrust bearing 46 absorbs thrust forces placed on shaft 14 and attempts to maintain proper axial alignment of the shaft.

While the particular force applied to thrust collar 48 by the fluid located in chambers 54, 56 should be selected as a function of the particular application of thrust bearing 46, this force should be low relative to the axial stiffness of a standard thrust bearing such as the tilting pad or tapered land types. The particular force exerted by the oil on the thrust collar can be adjusted by varying the operation of pumps 58, 60 and/or the dimensions of chambers 54, 56, opening 64 and spacing 66. In any case, the pressure of the oil in the chambers 54, 56 should be chosen such that thrust bearing 46 will exhibit a sufficiently low axial stiffness to permit thrust bearing 46 to accommodate changes in the relative positions of thrust collars 48 and 26 due to thermal expansion and other known variations. Additionally, the pressure of the fluid in chambers 54, 56 should be chosen to be sufficiently high to enable thrust bearing 46 to absorb the normal thrust forces which will be placed on bearing 46 when the shaft 14 is disengaged from standard thrust bearing 24.

In designing housing 50, the distance between side walls 68, 70 (which distance defines the axial float of bearing 46) should be sufficient to allow for the worst case of differential axial thermal expansion between the two thrust bearings and their supports. Preferably, the axial float of the thrust bearing should be at least 0.5 inches. In contrast, the axial float of a standard thrust bearing is typically only 0.01 to 0.02 inches.

Referring now to FIGS. 6 through 8, there is illustrated a hydrostatic-hydrodynamic thrust bearing 46' which is constructed in accordance with the principles of the present invention. The primary difference between thrust bearing 46 and thrust bearing 46' resides in the provision of tapered land surfaces 74, 76 located on opposite side walls 68, 70 of housing 50. The tapered land surfaces 74, 76 have a converging wedged shape as best illustrated in FIGS. 7 and 8. The provision of these surfaces creates a hydrodynamic film pressure in the area adjacent surfaces 74, 76 when the thrust collar 48 approaches either extreme of its permissible axial travel. The resultant bearing load capacity is illustrated in FIG. 9. As shown therein, thrust bearing 46 will operate as a hydrostatic bearing as long as both side walls 67, 69 of thrust collar 48 are at least x inches (typically a few thousandths of an inch) from surfaces 74, 76 of housing 50. When either side 67, 69 of thrust collar 48 comes within x inches of either surface 74, 76, a hydrodynamic film pressure is created between the side wall of collar 48 and the surface 74 or 76 increasing the force on the side wall and causing bearings 46' to operate in a hydrodynamic manner as shown.

The hydrodynamic-hydrostatic bearing 46' illustrated in FIGS. 6 through 8 is somewhat preferable to the hydrostatic bearing 46 of FIGS. 4 and 5 since it exhibits a substantially higher maximum load capacity than the simple hydrostatic bearing 46. As a result of this feature, the bearing 46' is capable of withstanding a much higher thrust load produced by generator 16 when the turbine 12 is disengaged from the generator 16. Additionally, when the turbine and generator shafts are coupled, the thrust bearing 46' is capable of supplying a reserve load capacity. Particularly, when the thrust collar 48 approaches either tapered land surface 74, 76, the thrust bearing 46' carries a substantially larger share of the turbine thrust.

While the thrust bearing 46' is capable of absorbing substantial thrust forces when unusually high forces are placed on shaft 14, it exhibits the desired low axial stiffness in all but the extreme operations of the thrust bearing. As such, the thrust collar 46' will exhibit sufficient axial float to prevent the thrust bearing 24 from receiving excessive thrust due to thermal expansion as described above.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A low axial stiffness thrust bearing comprising:
   a housing having a generally cylindrical space formed therein;
   a generally cylindrical thrust collar located coaxially within said cylindrical space, the axial length of said cylindrical space being significantly greater than the axial length of said thrust collar such that said thrust collar may be moved axially within said cylindrical space over a predetermined distance and such that first and second fluid chambers are formed on opposite sides of said thrust collar when said thrust collar is located centrally within said cylindrical space;
   fluid circuit means for supplying fluid under pressure to said first and second chambers in such a manner that said fluid attempts to maintain said thrust collar at a predetermined axial location within said cylindrical space even when external thrust forces are placed on said thrust collar and wherein the axial force placed on said thrust collar by said bearing in a first axial direction is determined by the fluid pressure in said first fluid chamber and wherein the axial force placed on said thrust collar by said bearing in a second opposite axial direction is determined by the fluid pressure in said second fluid chamber;
   the axial length of said first fluid chamber being defined between a first axial end of said thrust collar and a first axial end of said cylindrical space and the axial length of said second fluid chamber being defined between a second axial end of said thrust collar and a second axial end of said cylindrical space;
   said fluid pressure in said first and second fluid chambers varying as a function of the axial position of said thrust collar with respect to said predetermined location as long as the axial length of said first and second fluid chambers remains greater than a predetermined value; and
   pressure variation means for causing said fluid pressure in said first and second fluid chambers to vary as a second function of the axial position of said thrust collar with respect to said predetermined location whenever the axial length of the respective chamber falls below said predetermined value but is still greater than zero, said pressure variation means comprising first and second means for producing a hydrodynamic film pressure support in said first and second fluid chambers, respectively, whenever the respective axial length of said first and second chambers falls below said predetermined value.

2. A low axial stiffness thrust collar according to claim 1, wherein said first means comprises a tapered land surface formed on said first axial end of said cylindrical space and said second means comprises a tapered land surface formed on said second axial end of said cylindrical space.

* * * * *